United States Patent
Stone

(10) Patent No.: US 11,577,986 B2
(45) Date of Patent: Feb. 14, 2023

(54) METHOD OF MAKING AN IMAGING FIBRE APPARATUS AND OPTIAL FIBRE APPARATUS WITH DIFFERENT CORE

(71) Applicant: University of Bath, Bath (GB)

(72) Inventor: James Stone, Bath (GB)

(73) Assignee: University of Bath, Bath (GB)

( * ) Notice: Subject to any disclaimer, the term of this patent is extended or adjusted under 35 U.S.C. 154(b) by 0 days.

(21) Appl. No.: 17/529,984

(22) Filed: Nov. 18, 2021

(65) Prior Publication Data

US 2022/0073406 A1 Mar. 10, 2022

Related U.S. Application Data

(62) Division of application No. 16/479,273, filed as application No. PCT/GB2018/050173 on Jan. 19, 2018, now Pat. No. 11,377,384.

(30) Foreign Application Priority Data

Jan. 19, 2017 (EP) ...................................... 1700936

(51) Int. Cl.
  *C03B 37/028* (2006.01)
  *C03B 37/012* (2006.01)
  *G02B 6/06* (2006.01)

(52) U.S. Cl.
  CPC ...... *C03B 37/028* (2013.01); *C03B 37/01205* (2013.01); *G02B 6/06* (2013.01); *C03B 2203/40* (2013.01)

(58) Field of Classification Search
  None
  See application file for complete search history.

(56) References Cited

U.S. PATENT DOCUMENTS

| 479,550 A | 7/1892 | Bowman |
| 4,613,205 A | 9/1986 | Seiji et al. |

(Continued)

FOREIGN PATENT DOCUMENTS

| CA | 11420 A | 6/1880 |
| CN | 1029324 C | 7/1995 |

(Continued)

OTHER PUBLICATIONS

Weissleder R., and Pittet M. J, Nature 452, 580 589 (2008).

(Continued)

*Primary Examiner* — Chris H Chu
(74) *Attorney, Agent, or Firm* — Locke Lord LLP; Christopher J. Capelli

(57) ABSTRACT

A method of forming an imaging fibre apparatus comprises arranging rods to form a plurality of stacks each comprising a respective plurality of rods, wherein: for each stack, the respective plurality of rods comprises rods having different core sizes, the rods of different core sizes being arranged in a selected arrangement, and the rods of different core sizes being arranged such that each stack has a respective selected shape; wherein the selected shape or shapes are such that the stacks stack together in a desired arrangement; the method further comprising: drawing each of the plurality of stacks; stacking together the plurality of drawn stacks together in the desired arrangement to form a further stack; drawing the further stack; and using the drawn further stack to form an imaging fibre apparatus, wherein the selected arrangement of the rods in each stack and the selected shape or shapes of the stacks are such that the further stack comprises a repeating pattern of rods of different core sizes.

19 Claims, 10 Drawing Sheets

(56) References Cited

U.S. PATENT DOCUMENTS

| | | | |
|---|---|---|---|
| 5,048,923 A | 9/1991 | Tsumanuma et al. | |
| 6,041,154 A | 3/2000 | Ono et al. | |
| 6,243,520 B1 | 6/2001 | Goldman | |
| 6,317,542 B1* | 11/2001 | Hardwick, III | G02B 6/4433 385/112 |
| 6,856,713 B2 | 2/2005 | Nelson et al. | |
| 7,116,875 B2 | 10/2006 | Wadsworth et al. | |
| 7,155,099 B2 | 12/2006 | Broderick et al. | |
| 7,305,164 B2 | 12/2007 | Williams et al. | |
| 7,308,807 B2 | 12/2007 | Gerstner et al. | |
| 7,734,137 B2 | 6/2010 | Bennett et al. | |
| 9,211,681 B2 | 12/2015 | Holland et al. | |
| 2003/0044144 A1 | 3/2003 | Nelson et al. | |
| 2003/0091307 A1* | 5/2003 | Hurley | G02B 6/441 385/113 |
| 2004/0093906 A1 | 5/2004 | Gerstner et al. | |
| 2006/0239625 A1 | 10/2006 | Ishikawa et al. | |
| 2007/0128749 A1 | 6/2007 | Van Eijkelenborg et al. | |
| 2008/0190146 A1 | 8/2008 | Ishikawa et al. | |
| 2009/0169160 A1 | 7/2009 | Weingartner et al. | |
| 2012/0040184 A1 | 2/2012 | de Montmorillon et al. | |
| 2013/0209106 A1 | 8/2013 | Mukasa | |
| 2014/0003776 A1 | 1/2014 | Gibson et al. | |
| 2014/0233899 A1* | 8/2014 | Miyamoto | G02B 6/441 385/109 |
| 2016/0241796 A1* | 8/2016 | Curreri | H04N 5/2256 |

FOREIGN PATENT DOCUMENTS

| | | |
|---|---|---|
| CN | 1291254 A | 4/2001 |
| CN | 1306296 A | 8/2001 |
| CN | 1564034 A | 1/2005 |
| CN | 1601309 A | 3/2005 |
| CN | 1766685 A | 5/2006 |
| CN | 1882513 A | 12/2006 |
| CN | 1938580 A | 3/2007 |
| CN | 100584784 C | 1/2010 |
| CN | 100585389 C | 1/2010 |
| CN | 101702045 A | 5/2010 |
| CN | 102436036 A | 5/2012 |
| CN | 102520478 A | 6/2012 |
| CN | 102520479 A | 6/2012 |
| CN | 102798931 A | 11/2012 |
| CN | 103951184 A | 7/2014 |
| CN | 104181636 A | 12/2014 |
| CN | 104355533 A | 2/2015 |
| CN | 105206326 A | 12/2015 |
| CN | 105700067 A | 6/2016 |
| DE | 69031607 T2 | 3/1998 |
| DE | 102004028310 A1 | 1/2006 |
| EP | 627074 A1 | 12/1994 |
| EP | 1006376 A1 | 6/2000 |
| EP | 1069446 A1 | 1/2001 |
| EP | 1298463 A1 | 4/2003 |
| EP | 1409422 A1 | 4/2004 |
| EP | 18778452 | 1/2008 |
| EP | 2320256 A1 | 5/2011 |
| EP | 2685296 A1 | 1/2014 |
| EP | 3917422 A1 | 12/2021 |
| GB | 1003861 A | 9/1965 |
| GB | 1083513 A | 9/1967 |
| GB | 1113229 A | 5/1968 |
| GB | 1376300 A | 12/1974 |
| GB | 2079741 A | 1/1982 |
| JP | S60184209 A | 9/1985 |
| JP | 1986026005 | 2/1986 |
| JP | 62035977 | 2/1987 |
| JP | 05060925 | 3/1993 |
| JP | 05060926 | 3/1993 |
| JP | H0561417 A | 3/1993 |
| JP | 05127024 | 5/1993 |
| JP | 05345632 | 12/1993 |
| JP | 06239642 | 8/1994 |
| JP | 08248245 | 9/1996 |
| JP | 09005543 | 1/1997 |
| JP | 09255352 | 9/1997 |
| JP | 10186149 | 7/1998 |
| JP | 2830617 B2 | 12/1998 |
| JP | 2000066053 A | 3/2000 |
| JP | 2000075149 A | 3/2000 |
| JP | 2000147271 A | 5/2000 |
| JP | 2003206148 A | 7/2003 |
| JP | 2004078123 A | 3/2004 |
| JP | 2004149353 | 5/2004 |
| JP | 2005097106 A | 4/2005 |
| JP | 2005510434 A | 4/2005 |
| JP | 3645626 B2 | 5/2005 |
| JP | 2005179095 A | 7/2005 |
| JP | 2005206394 A | 8/2005 |
| JP | 2005222087 A | 8/2005 |
| JP | 2005255422 A | 9/2005 |
| JP | 2005289764 A | 10/2005 |
| JP | 2005292313 A | 10/2005 |
| JP | 2005298289 A | 10/2005 |
| JP | 2006058774 A | 3/2006 |
| JP | 2006069871 A | 3/2006 |
| JP | 3857745 B2 | 12/2006 |
| JP | 2007219275 A | 8/2007 |
| JP | 3995000 B2 | 10/2007 |
| JP | 4343066-82 | 10/2009 |
| JP | 2010013328 A | 1/2010 |
| JP | 2012168310 A | 9/2012 |
| JP | 2012222613 A | 11/2012 |
| JP | 2013040063 A | 2/2013 |
| JP | 5251306 B2 | 7/2013 |
| JP | 2013186243 A | 9/2013 |
| JP | 2013202082 A | 10/2013 |
| JP | 5372082 B2 | 12/2013 |
| JP | 2014228705 A | 12/2014 |
| JP | 2015000267 A | 1/2015 |
| JP | 2015135497 A | 7/2015 |
| JP | 5778939 B2 | 9/2015 |
| JP | 2016513274 A | 5/2016 |
| JP | 5948084 B2 | 7/2016 |
| NL | 8120309 A | 7/1982 |
| RU | 2578693 C1 | 3/2016 |
| WO | 8907257 A1 | 8/1989 |
| WO | WO-0142829 A2 | 6/2001 |
| WO | WO-200240416 A1 | 5/2002 |
| WO | WO-2002102578 A1 | 12/2002 |
| WO | WO-200316967 A1 | 2/2003 |
| WO | WO-2003341082 | 4/2003 |
| WO | WO-200398291 A1 | 11/2003 |
| WO | WO-200401461 A1 | 12/2003 |
| WO | WO-200419088 A1 | 3/2004 |
| WO | WO-2005910292 | 9/2005 |
| WO | WO-200898338 A1 | 8/2008 |
| WO | WO-2012137789 A1 | 10/2012 |
| WO | WO-201324839 A1 | 2/2013 |

OTHER PUBLICATIONS

B. I. Hirschowitz, Lancet 277, 1074 (1961).
A. W. Snyder and J. D. Love, "Optical waveguide theory," Kluwer academic publishers, p. 387 (1983).
Schott North America, "An introduction to fiber optic imaging," Schott (2007).
Schott, http://www.us.schott.com/lightingimaging/english/medical/medicalproducts/transmittingimages_leachedimagebundle.html.
Fujikura, http://www.fujikura.co.uk/products/medicalindustrialopticalfibre/imagefibre/ (2007).
X. Chen, K. L. Reichenbach, and C. Xu, Opt. Express 16, 2159821607 (2008). (Experimental and theoretical analysis of coretocore coupling on fiber bundle imaging, Xianpei Chen, Dec. 22, 2008 / vol. 16. No. 26 / Optics Express 21598).
M. Koshiba, K. Saitoh, and Y. Kokubun, IEICE Electron. Express 6(2), 98103 (2009). [hetero fibre design].
Bunschoten A. et al., Bioconjugate Chem. 24, 1971 1989 (2013).
Dorward D. A. et al., Pharmacol. Ther. 135, 182 199 (2012).
Avlonitis N. et al., Org. Biomol. Chem. 11, 4414 4418 (2013).
Akram A. R. et al., Chem. Sci.. 6, 6971 6979 (2015).

(56) References Cited

OTHER PUBLICATIONS

Aslam T. et al., Chem. Sci.. 6, 4946 4953 (2015).
N. Krstaji, A.R. Akram, T.R. Choudhary, et al; J. Biomed. Opt. 21(4), (2016).
E. Hecht, "Optics," 2nd ed. p. 505, AddisonWesley (1987).
JM Stone et al. Reduced indexcontrast imaging fibres (poster) (2010).
Birks, T. A., Gris Sanchez, I., Yerolatsitis, S., LeonSaval, S. G. and Thomson, R. R. (2015) The photonic lantern. Advances in Optics and Photonics, 7 (2). pp. 107167. ISSN 19438206.
M. R. E. Lamont, Y. Okawachi, and A. L. Gaeta, Opt. Lett. 38, 3478 (2013).
A. CorderoDavila, J. R. KantunMontiel, and J. GonzalezGarcia, in imaging and Applied Optics Technical Digest 2012 (Optical Society of America, 2012), p. 13.
Photonic crystal fibres, Jonathan C. Knight, Nature | vol. 424 | Aug. 14, 2003 | www.nature.com/nature.
Superlattice Microstructured Optical Fiber, MingLeung Vincent Tse et al, Materials 2014, 7, 45674573; doi:10.3390/ma7064567.
Multielement hollowcore antiresonant fiber for infrared thermal imaging, Takuya Kobayashi et al, vol. 24, No. 23 | Nov. 14, 2016 | Optics Express 26566.
Allsilica singlemode optical fiber with photonic crystal cladding, J. C. Knight et al., Oct. 1, 1996 / vol. 21, No. 19 / Optics Letters.
Hollow core photonic crystal fibers for beam delivery, G. Humbert et al, Apr. 19, 2004 / vol. 12, No. 8 / Optics Express 1477.
Design and properties of hollow antiresonant fibers for the visible and near infrared spectral range, Walter Belardi(2015).
H.A.C. Wood, J. M. Stone, K. Harringtwon, T. A. Birks and J. C. Knight, "Quantitative characterisation of endoscopic imaging fibres," 2016 Conference on Lasers and ElectroOptics (CLEO), 2016, pp. 12.
International Search Report and Written Opinion for PCT Application No. PCT/2018/050173, dated Mar. 29, 2018.
Patent Office Search Report for Great Britain Patent Application No. GB1700936.6, dated Jun. 1, 2017.
PCT International Preliminary Report on Patentability for PCT Application No. PCT/GB2018/050173, dated Aug. 1, 2019.
Japanese Office Action for Japanese Patent Application No. JP2019539176, dated Nov. 9, 2021.

* cited by examiner

METHOD OF MAKING AN IMAGING FIBRE APPARATUS AND OPTIAL FIBRE APPARATUS WITH DIFFERENT CORE

This Application is a Divisional of application Ser. No. 16/479,273 filed on Jul. 19, 2019 which is a National Stage of Application PCT/GB2018/050173 filed Jan. 19, 2018 which claims priority to Application EP1700936.6 filed on Jan. 19, 2017. The entire contents of these applications are incorporated herein by reference in their entirety.

FIELD

The present invention relates to an optical fibre apparatus, for example a spatially coherent imaging fibre, and a method of making an optical fibre apparatus.

BACKGROUND

A coherent imaging fibre (which may be referred to as a fibre bundle) may comprise many thousands of light guiding cores, each of which transmits a part of an image along the fibre length. Each core may act as a pixel to build up an image.

In order to build up high resolution images, the cores of the fibre may be placed close together. There may be a limit to how close to each other the cores may be placed. When cores get too close together, light in one core may couple out of that core and into another core. Such coupling of light between cores may degrade a transmitted image.

One method of reducing core to core coupling may be to increase the numerical aperture of the cores. However, glass manufacturing limitations may dictate how cost effective a method comprising increasing the numerical aperture may be. Increasing the numerical aperture of the cores may lead to background fluorescence.

Fibres may be formed using germanium doped silica. However, the production of fibres comprising germanium doped silica may be difficult and/or involve high stresses.

Another method of reducing core to core coupling may be to make adjacent cores dissimilar. For example, adjacent cores may be made from different materials. Adjacent cores may have different sizes.

An imaging fibre may be created by randomly packing different cores together in a jacket tube and drawing the cores and jacket tube to fibre. However, random packing may result in some nearest neighbour cores that are the same, due to the random nature of the core distribution. Core to core coupling may occur between nearest neighbour cores.

Fibres available from Schott AG stack arrays of uniform cores made from specialty glasses with high index contrasts compared with the cladding glasses. Schott AG also provide fibres having absorbing interstitial elements or leached fibre bundles where the interstitial glass is etched away, leaving a bundle of isolated cores joined at either end of the fibre and separated by air along the fibre length.

Fujikura, Ltd produce imaging fibres based on doped silica glasses in which cross talk is suppressed by using high NA (~0.4) step cores with a random variation in size and random spatial distribution. It may be difficult to acquire the raw materials to fabricate such a fibre economically. This may result in high manufacturing costs.

The widespread use of endoscopic imaging fibres is now commonplace in biology and medicine. These fibres may allow microscopy, rapid imaging of tissues and surgical guidance, potentially reducing the need for invasive removal of tissue for diagnosis. Originally developed in the late 1950s, current clinical state-of-the-art endoscopic imaging fibres cost several thousands of dollars, need to be sterilized between uses and have limited use life cycles. For example, in some current systems, an upper limit to the number of uses may be 20 uses, after which the imaging fibre may need to be replaced at significant cost.

SUMMARY

In a first aspect of the invention, there is provided a method of forming an optical fibre apparatus comprising arranging rods to form a plurality of stacks each comprising a respective plurality of rods. For each stack, the respective plurality of rods may comprise rods having different core sizes, the rods of different core sizes being arranged in a selected arrangement, and the rods of different core sizes being arranged such that each stack has a respective selected shape. The selected shape or shapes may be such that the stacks stack together in a desired arrangement. The method may further comprise: drawing each of the plurality of stacks; stacking together the plurality of drawn stacks together in the desired arrangement to form a further stack; and drawing the further stack. The method may comprise using the drawn further stack to form an optical fibre apparatus. The optical fibre apparatus may comprise an imaging fibre apparatus.

The selected arrangement of the rods in each stack and the selected shape or shapes of the stacks may be such that the further stack comprises a repeating pattern of rods of different core sizes. The repeating pattern may extend across all, or at least a plurality, of the stacks. Substantially the same repeating pattern may be obtained for all, or at least a plurality, of the stacks. Thus, the optical fibre apparatus may comprises a repeating pattern of rods of different core sizes, for example across substantially all of its fibre cross-sectional area.

Including rods having different core sizes in each stack may reduce cross-talk between the rods in the stack, when compared with a stack in which the rods are of the same size.

Using cores having dissimilar core sizes instead of other methods of cross-talk reduction may allow lower cost materials to be used. In some circumstances, a lower cost material with dissimilar cores may have similar performance to that of a higher cost material having a uniform core size.

The rods may comprise any material that may be used to form an optical fibre, for example any suitable fibre that may be subject to a drawing process to produce an optical fibre having desired properties. The stack may comprise any suitable arrangement of the rods, for example any suitable arrangement in which the rods are arranged next to each other and substantially parallel along their lengths. In some arrangements additional material may be provided between the rods.

Each plurality of rods may comprise rods having at least three different core sizes.

The selected shape or shapes may be such that the stacks, when drawn, stack together in a desired arrangement. The desired arrangement may comprise a tiling. The desired arrangement may comprise a space-filling arrangement. The shape or shapes may comprise any combination of shapes that may be tiled or tessellated in a plane.

Each rod may comprise a core and cladding.

For each stack, the respective plurality of rods may comprises rods having different outer sizes. The different outer sizes may comprise different cladding sizes. The different outer sizes may comprise at least one of: different outer diameters, different outer cross-sections, different cladding diameters, different cladding cross-sections.

For each stack, each of the respective plurality of rods may have substantially the same ratio of core size to outer size. Rods of different core sizes may each have substantially the same ratio of core size to cladding size. For example, each rod may have the same ratio of core diameter to cladding diameter.

The method may further comprise obtaining the rods by drawing at least one preform.

The obtaining of the rods may comprise drawing a selected type of preform. Different core sizes may be obtained by drawing the same selected type of preform differently. For example, different core sizes may be obtained by drawing down the same selected type of preform at different speeds. A single preform may be drawn into different sizes of rod by changing a drawing speed, without making other changes, for example rejacketing.

By obtaining the different core sizes from a single, selected type of fibre preform, cost and/or complexity may be reduced when compared with methods in which rods are drawn down from different fibre preforms.

The selected type of fibre preform may comprise different fibre preforms made of substantially the same materials. The single type of fibre preform may comprise fibre preforms having substantially the same outer diameter and core diameter. The rods may be formed of different fibre preforms of substantially the same type, or from a single length of selected preform.

Using different sizes of rod that are drawn from the same preform may result in a coherent imaging fibre that has a desired imaging performance at low cost. Cross-talk between the imaging cores may be reduced by the difference in size between adjacent rods.

The method may comprise jacketing the further stack, for example either before or after the drawing of the further stack. The using of the drawn further stack to form an imaging fibre apparatus may comprise jacketing the further stack. The method may comprise placing the further stack in a jacket tube, optionally with at least one further element, for example packing glass, and performing for example a heating process and/or compression process and/or a further drawing process on the combination of the further stack and jacket tube.

The plurality of rods may be substantially unjacketed when the drawing processes on the plurality of stacks are performed. The further stack may be substantially unjacketed, or may be jacketed, when the drawing of the further stack is performed.

The selected arrangement may be such that, for each rod, the nearest-neighbour rods for said rod have different core sizes to said rod.

For each stack, the arranging of the respective plurality of rods having different core sizes may comprise arranging the respective plurality of rods such that nearest-neighbour rods have different core sizes.

The arranging may be such that no rod is adjacent to another rod having the same core size.

Arranging rods such that nearest neighbour rods have different core sizes may reduce cross-talk between cores. Reducing cross-talk may improve signal transmission through the optical fibre apparatus. For example, if the apparatus is used for imaging, imaging quality may be improved.

The selected arrangement may be such that, for each rod, the next-to-nearest neighbour rods for said rod have different core sizes to said rod.

Arranging the plurality of rods having different core sizes may comprise arranging the plurality of rods in a regular array.

The or each selected shape, for example the shape of a cross-section of the stack, may comprise a regular shape. The or each regular shape may comprise at least one of a square, a rectangle, a rhombus, a parallelogram, a hexagon, a regular polygon. Each of the stacks may have substantially the same selected shape.

The drawn stacks may be stacked together such that each stack is in the same orientation. The further stack may comprise a periodic arrangement of rods.

The stacking of the drawn stacks together to form a further stack may comprise stacking the drawn stacks to substantially fill a desired space, such that there is substantially no gap between the drawn stacks. The drawn stacks may be arranged such that at least some adjacent rods in different stacks are touching.

Each stack may have the same arrangement of rods. Each of the stacks may have substantially the same selected arrangement of rods.

Each drawn stack may comprise at least one unit cell. The further stack may comprise a repeating arrangement of unit cells.

Stacking the drawn stacks of the at least one selected shape may correspond to a tiling of the selected shapes or shapes to substantially fill a plane. The tiling may be such as to form a repeating arrangement of rods of different sizes.

The use of stacks having at least one selected shape may result in easy multi-stacking. For example, a stack that is arranged as a square array may be drawn down to form a square unit cell, which may stack easily with other square unit cells.

The stack may comprise an n×n square array of rods, where n is greater than or equal to 4.

Each stack may comprise a plurality of rows and a plurality of columns. For each stack, each row of the stack may comprise at least one rod of each of a plurality of different core sizes. Each column of the stack comprises at least one rod of each of the plurality of different core sizes.

Using a square array or rectangular array may make it easy to arrange any desired number n of different core sizes, for example by including one or more rod having each of the different core sizes per row or column. For example, it may be easier to arrange the different sizes of rods in a square array than in a hexagonal array.

The plurality of different core sizes may comprise N different core sizes

Each stack comprise an N by N array of rods. For each stack, each row of the stack may comprise one rod of each of the N different core sizes. For each stack, each column of the stack may comprise one rod of each of the N different core sizes.

Each stack may comprise an array of yN columns by zN rows. For each stack, each row of the stack may comprise y rods of each of the N different core sizes. For each stack, each column of the stack may comprise z rods of each of the N different core sizes.

Five different core sizes may be denoted A to E in order of ascending size. The stack may comprise a square array having the following arrangement of rods:
DACEB
CEBDA
BDACE
ACEBD
EBDAC.

The plurality of rods may comprise rods having at least five different core sizes. The arranging of the plurality of rods may be such that next-to-nearest neighbour rods have different core sizes.

The arranging may be such that no rod has a nearest neighbour or next-to-nearest neighbour rod having the same core size.

Arranging the rods such that next-to-nearest neighbour rods have different core sizes may further reduce cross-talk.

The plurality of rods may comprise rods having at least nine different core sizes. The arranging of the plurality of rods may be such that next-to-next-to-nearest neighbour rods have different core sizes. The arranging may be such that no rod has a nearest neighbour, next-to-nearest neighbour or next-to-next-to-nearest neighbour rod having the same core size.

The stacking of the drawn stacks together to form a further stack may comprise stacking the drawn stacks together to form a repeating arrangement of unit cells.

Using a process in which a stack is drawn down and then further stacked may allow an optical fibre apparatus having a large number of cores to be formed in multiple stages. The stack may be configured for easy stacking. For example, a square stack may easily stack with other square stacks. In some circumstances, the use of a stack that has a simple geometric shape may result in some tolerance for distortions, for example tolerance for deformations resulting from drawing down.

The forming of the optical fibre apparatus may comprise performing at least one further stacking and drawing of the drawn further stack.

For each stack, arranging the respective plurality of rods to form the stack may comprise positioning spacer elements between at least some of the respective plurality of rods. For example, the spacer elements may comprise solid rods. The spacer elements may not be light-transmitting.

Each rod may comprises at least one of silica, Ge-doped silica, Fluorine doped silica, boron doped silica, Aluminium doped silica, silicate glass.

The outer diameters of the plurality of rods of different sizes may be between 0.5 mm and 10 mm, optionally between 1 mm and 5 mm. The outer diameters of the plurality of rods of different sizes may be greater than 0.1 mm, optionally greater than 0.5 mm, further optionally greater than 1 mm. The outer diameters of the plurality of rods of different sizes may be less than 20 mm, optionally less than 10 mm, further optionally less than 5 mm.

A width of the stack may be between 1 mm and 1000 mm, optionally between 5 mm and 500 mm, further optionally between 10 mm and 100 mm. The width of the stack may be greater than 1 mm, optionally greater than 5 mm, further optionally greater than 10 mm. The width of the stack may be less than 1000 mm, optionally less than 500 mm, further optionally less than 100 mm.

A numerical aperture of each rod may be less than 0.35, optionally less than 0.32, further optionally less than 0.3.

The optical fibre apparatus may comprise an imaging fibre apparatus. The optical fibre apparatus may comprise a coherent imaging fibre.

In a second aspect of the invention, which may be provided independently, there is provided an optical fibre apparatus comprising cores of different core sizes separated by cladding, wherein the cores of different core sizes are arranged to form a selected repeating pattern of different core sizes.

The repeating arrangement may comprise a repeating arrangement of unit cells. Each unit cell may have the same arrangement of different core sizes.

Each unit cell may comprise a n×n square array of cores. n may be is greater than or equal to 4.

Each unit cell may comprise a plurality of rows of cores and a plurality of columns of cores. Each row may comprise at least one core of each of a plurality of different core sizes. Each column may comprise at least one core of each of the plurality of different core sizes.

The cores may be arranged such that for each core, the nearest-neighbour cores for said core have different core sizes to said core.

The cores may arranged such that for each core, the next-to-nearest-neighbour cores for said core have different core sizes to said core.

The optical fibre apparatus may comprise a plurality of rows and a plurality of columns. Each row may comprise at least one core of each of the different core sizes. Each column may comprise at least one core of each of the different sizes.

The plurality of cores may comprise cores having at least five different sizes. The cores may be arranged such that for each core the next-to-nearest neighbour cores for said core have different core sizes to said core.

Each of the cores may have a core diameter between 1 μm and 100 μm. Each of the cores may be configured to guide light in a transmission direction. The diameter of each core may be determined in a plane that is substantially perpendicular to the transmission direction. The core diameter may comprise, for example, a maximum diameter, a minimum diameter, or an average diameter.

A centre to centre spacing of the cores may be less than 100 μm, optionally less than 10 μm, further optionally less than 5 μm.

The optical fibre apparatus may be configured for use in imaging.

The optical fibre apparatus may be configured to transmit at least one of visible light, infrared light, ultraviolet light.

An optical coupler may be coupled to the optical fibre apparatus and to a light source and/or light detector.

There may be provided a fibre assembly comprising: an optical fibre apparatus as claimed or described herein or formed using a method as claimed or described herein; at least one further optical fibre and/or at least one capillary tube; and a package containing the optical fibre and the at least one optical fibre and/or at least one capillary. The package may comprise, for example, a glass or polymer tube. The optical fibre apparatus may comprise an imaging fibre apparatus.

The fibre assembly may comprise any combination of elements, for example any combination of imaging fibres, sensing fibres and/or support elements. The fibre assembly may be formed from stacks, which may comprise stacks of different types of element. For example, imaging stacks may be interspersed with sensor stacks. The fibre assembly may be formed from stacks having different shapes and/or sizes. For example, large imaging stacks may be interspersed with small sensor stacks.

The fibre assembly may further comprise an optical coupler configured to couple the optical fibre apparatus to a light source and/or light detector.

The fibre assembly may further comprise a further coupler configured to couple the or each further optical fibre to at least one sensing apparatus The fibre assembly may further comprise a connector configured to couple the or each capillary tube to a fluid insertion device, for example a syringe.

A distal end of the fibre assembly may be configured for insertion into a human or animal subject.

There may also be provided an apparatus or method substantially as described herein with reference to the accompanying drawings.

Any feature in one aspect of the invention may be applied to other aspects of the invention, in any appropriate combination. For example, apparatus features may be applied to method features and vice versa.

BRIEF DESCRIPTION OF THE DRAWINGS

Embodiments of the invention are now described, by way of non-limiting examples, and are illustrated in the following figures, in which:—

FIG. 1 is a schematic illustration of a fibre drawing apparatus 10 comprising heating elements 20 and a fibre pulling mechanism 22. Other components of the fibre drawing apparatus have been omitted for clarity. FIG. 1 is not illustrated to scale.

In the present embodiment, the fibre drawing apparatus 10 is an item of telecommunications equipment and is configured to control diameter of a drawn fibre to within microns. In other embodiments, any suitable fibre drawing apparatus may be used.

The fibre drawing apparatus 10 is configured to draw a fibre preform 30 comprising a core region 32 and cladding region 34.

Figure 1:
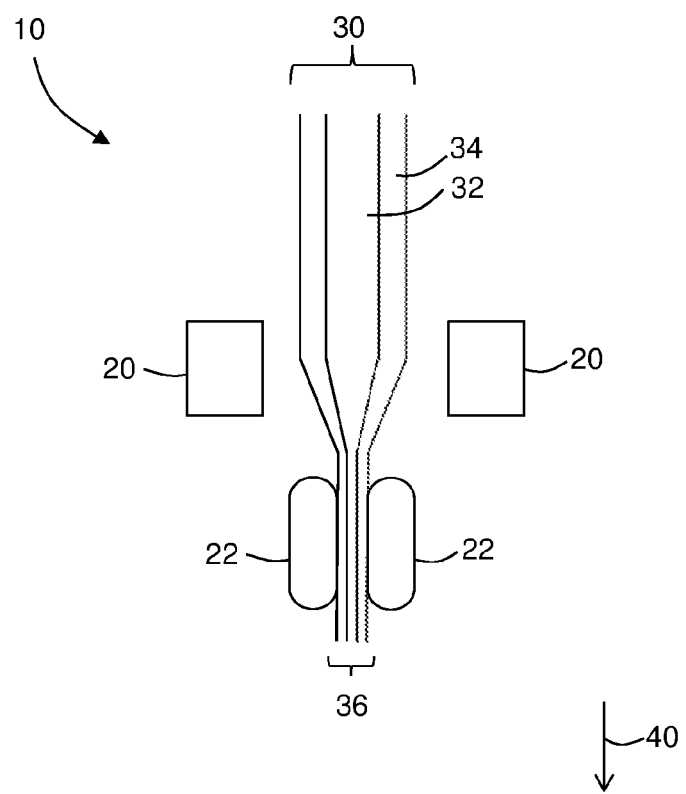
FIG. 1 is a schematic illustration of an apparatus for drawing down a fibre preform to form an optical fibre.

To draw the fibre preform 30, the fibre preform is pulled by the pulling mechanism in a direction indicated by arrow 40 (which in FIG. 1 is downwards).

The fibre preform 30 is heated by heating elements 20 so that it becomes soft and may be drawn. The fibre preform 30 is pulled by the pulling mechanism 22 so that it increases in length and decreases in cross-section. The output of the fibre pulling apparatus 10 is a rod 36 having substantially the same ratio of core size to cladding size as the original fibre preform 30, but a much smaller cross-section.

The ratio of core size to cladding size (for example, a ratio of core diameter to cladding diameter) may be referred to as a core to cladding ratio. The cladding size may also be referred to as an outer size.

Figure 2:
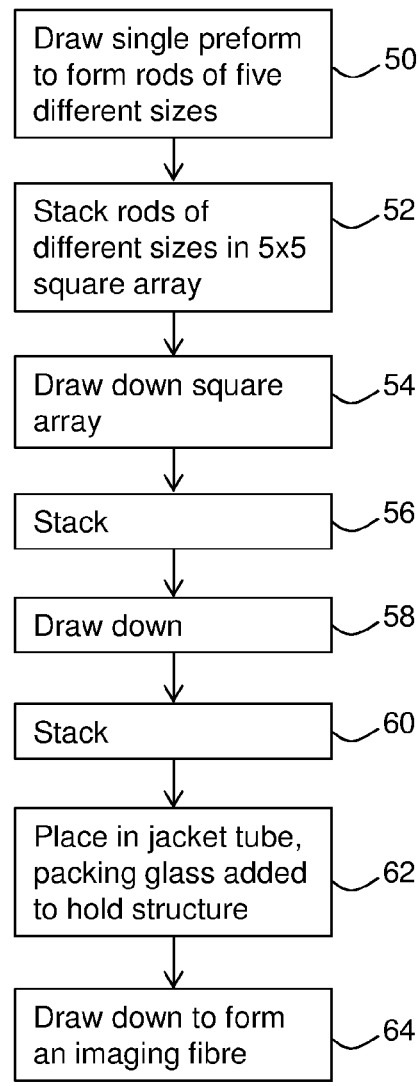
FIG. 2 is a flow chart illustrating in overview a method of an embodiment.

FIG. 2 is a flow chart illustrating in overview a method of forming an optical fibre apparatus in accordance with an embodiment. The optical fibre apparatus is a multiple core optical fibre apparatus. In this embodiment, the optical fibre apparatus is a coherent imaging fibre comprising 2025 imaging cores. In other embodiments, the optical fibre apparatus may be any suitable optical fibre apparatus comprising any number of cores, for example comprising hundreds, thousands, or tens of thousands of cores.

At stage 50 of FIG. 2, fibre drawing apparatus 10 is used to draw a single type of fibre preform 30 to form rods of five different sizes 36A, 36B, 36C, 36D, 36E. Individual core rods with low index cladding are drawn from the single type of fibre preform. The single type of fibre preform comprises one or more pieces of fibre preform each having the same material composition, core diameter and cladding diameter.

In the present embodiment, fibre preform 30 is a multimode telecoms grade preform which is formed from silica. The fibre preform 30 is designed for mass production. The fibre preform 30 is graded index with a parabolic graded index profile.

Fibre preform 30 has an outer diameter of 30 mm and a length of 1 metre. Fibre preform 30 comprises a cladding region 34 having a refractive index of 1.46 and a core region 32 having a peak refractive index of 1.49. The diameter of the core region 32 is 23 mm. The core to cladding ratio of the fibre preform 30 is 0.72. In other embodiments, any suitable fibre preform may be used.

The fibre preform 30 may be considered to be an off-the-shelf component having a standard size.

The fibre preform 30 is drawn down to five different sizes using fibre drawing apparatus 10. For example, fibre drawing apparatus 10 may draw down a length of fibre preform 30 to a first size to form a first plurality of rods 36A by operating the fibre drawing apparatus 10 at a first speed and cutting off 1 metre lengths of rod to form the first plurality of rods 36A. In other embodiments, any lengths of rods may be used.

Fibre drawing apparatus 10 may then draw down a further length of fibre preform 30 to a second size to form a second plurality of rods 36B by operating the fibre drawing apparatus 10 at a second speed, and cutting off 1 metre lengths of rod to form the second plurality of rods 36B. Apparatus 10 may draw down further lengths of fibre preform 30 to third, fourth and fifth sizes to form third, fourth, and fifth pluralities of rods 36C, 36D, 36E respectively by operating the fibre drawing apparatus 10 at third, fourth and fifth speeds. In other embodiments, any lengths of rod may be used, and any number of pieces of fibre preform may be used to form the rods.

Different sizes of rods 36A, 36B, 36C, 36D, 36E may be produced from the same preform by operating the fibre drawing apparatus 10 at different speeds, without making any other changes to the preform, for example without an additional jacketing stage.

In other embodiments, any suitable drawing process and drawing apparatus may be used. For example, a fibre drawing process may be as described at page 8 of *An Introduction to Fiber Optic Imaging*, Schott North America, Second Edition, Schott, 2007.

In the description below, references to rods having different core sizes and/or outer sizes refer to rods having different core sizes and/or outer sizes in a direction perpendicular to a length of the rod, for example rods having different core and/or outer diameters, and/or different core and/or outer cross-sectional areas.

Each plurality of rods 36A, 36B, 36C, 36D, 36E has a different outer diameter. Each plurality of rods 36A, 36B, 36C, 36D, 36E has a different core diameter. Since the rods 36A, 36B, 36C, 36D, 36E are made from the same fibre preform 30, every rod 36A, 36B, 36C, 36D, 36E has substantially the same core to cladding ratio.

In the present embodiment, the outer diameters of the pluralities of rods range between 2.23 mm and 3.17 mm. The outer diameters and core diameters vary by around 8% from a central value. From smallest to largest, the sizes are −16%, −8%, 0%, +8% and +16% when compared with a central value. In other embodiments, different outer diameters may be used. Any appropriate range of sizes may be used.

In the present embodiments, the first plurality of rods 36A each have an outer diameter of 2.23 mm. The second plurality of rods 36B each have an outer diameter of 2.52 mm. The third plurality of rods 36C each have an outer diameter of 2.74 mm. The fourth plurality of rods 36D each have an outer diameter of 2.95 mm. The fifth plurality of rods 36E each have an outer diameter of 3.17 mm.

In the present embodiment, five different sizes of rods 36A, 36B, 36C, 36D, 36E are drawn from fibre preform 30. In other embodiments a different number of sizes of rods may be drawn. For example, n different sizes of rod may be drawn, where n is at least 3. In the present embodiment, all five different sizes of rods are drawn from the same type of fibre preform. In other embodiments, the different sizes of rods may be drawn from different fibre preforms. Any appropriate rod that is configured for light transmission may be used, for example any rod that is configured to transmit infrared, visible and/or ultraviolet light.

At stage 52 of FIG. 2, five of each size of rod 36A, 36B, 36C, 36D, 36E (i.e. 25 rods in total) are stacked in a 5×5 square array to form a stack of rods which may be referred to as a primary stack 70. We note that the terms arranging and stacking may be used interchangeably to describe the vertical arrangement of elements.

Figure 3:
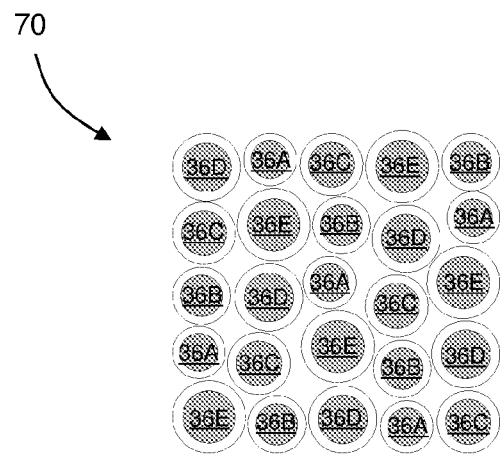
FIG. 3 is a schematic illustration of one preform drawn to five different sizes and stacked in a square stack.

FIG. 3 is an illustration of a cross-section of the primary stack 70. Although in the present embodiment the rods are stacked together without the inclusion of any further rods, in other embodiments spacer rods may be included between at least some of the rods 36A, 36B, 36C, 36D, 36E. The spacer rods may also be referred to as spacer elements. The spacer rods may not comprise cores, and may not be configured to transmit light.

Each row of the primary stack 70 comprises 5 rods 36A, 36B, 36C, 36D, 36E, each having a different core size, such that all five core sizes are represented in the row. Similarly, each column of the primary stack 70 comprises 5 rods 36A, 36B, 36C, 36D, 36E, each having a different core size, such that all five core sizes are represented in the row. The rods are stacked such that each rod has a different core size from its nearest neighbours. Each rod also has a different core size from its next-to-nearest neighbours. In the present embodiment, no rod is a nearest neighbour or next-to-nearest neighbour of another rod having the same core size.

In the present embodiment, if the rods 36A, 36B, 36C, 36D, 36E are referred to by letters A to E (A to E being in order of ascending size), the arrangement of the rods 36A, 36B, 36C, 36D, 36E in the primary stack may be represented as an array of letters as shown below, where rows and columns of letters represent rows and columns of rods:

DACEB
CEBDA
BDACE
ACEBD
EBDAC.

The 5×5 array comprises 5 rods of each of the 5 sizes. Each different rod size appears once in each row or column of the square stack. No adjacent rod sizes are the same. The different sizes of rods 36A, 36B, 36C, 36D, 36E are arranged such that, even though the individual elements of the primary stack 70 differ in size, the primary stack 70 as a whole is substantially square. The primary stack may be considered to have a selected shape, which in this embodiment is a square. In other embodiments, the selected shape may be any regular shape, for example a rectangle, parallelogram, rhombus or hexagon. The selected shape may comprise, for example, any regular polyhedron. The selected shape may be such that a primary stack having the selected shape may be stacked with other primary stacks having the selected shape and/or other primary stacks having one or more further selected shapes.

From FIG. 3, it may be seen that each individual row and/or column of the primary stack 70 may not be entirely straight due to the size differences between the rods, but that it may be possible to draw a substantially square outer boundary around the primary stack 70.

Once the rods 36A, 36B, 36C, 36D, 36E have been stacked as a primary stack 70 as shown in FIG. 3, the ends of the rods 36A, 36B, 36C, 36D, 36E are fused to inhibit relative movement between the rods 36A, 36B, 36C, 36D, 36E, keeping the primary stack 70 of rods arranged as a square. In the present embodiment, the rods 36A, 36B, 36C, 36D, 36E are taped using PTFE tape and fused at both ends by hand. In other embodiments, the rods In the present embodiment, the rods 36A, 36B, 36C, 36D, 36E may be held together in the square stack 70 in any suitable manner.

Although only one stack 70 is shown in FIG. 3, in practice many stacks 70 are formed at stage 52. Each array is a 5×5 array of rods 36A, 36B, 36C, 36D, 36E as shown in FIG. 3. In the present embodiment, the total number of stacks 70 that is made at stage 52 is 81.

At stages 54 and 56 of FIG. 2, the primary stack 70 which forms a uniform square is drawn down and stacked again as described below.

At stage 54, each primary stack 70 is drawn down using fibre drawing apparatus 10, or using a further fibre drawing apparatus (not shown). During the drawing process, the rods 36A, 36B, 36C, 36D, 36E are heated and become fused to each other at the points at which they touch. However, interstitial air gaps remain between the rods 36A, 36B, 36C, 36D, 36E.

The primary stack 70, once drawn down, may be considered to form a secondary unit cell 72. The rods 36A, 36B, 36C, 36D, 36E may be considered to be non-uniformly sized primary unit cells in a multi-stacking process. Stages 52 and 54 may be considered to create a uniformly sized secondary unit cell from non-uniformly sized primary unit cells 36A, 36B, 36C, 36D, 36E.

Secondary unit cell 72 has a much smaller cross-section than the primary stack 70 from which it is drawn down. However, secondary unit cell 72 remains substantially square after drawing down. The rods 36A, 36B, 36C, 36D, 36E maintain their square arrangement.

In the present embodiment, the primary stack 70 shown in FIG. 3 has a side length of 14 mm. The secondary unit cell 72 obtained from the primary stack 70 has a side length of 2.5 mm.

At stage 56, 9 secondary unit cells 72 are stacked in a 3×3 array, which may be referred to as a secondary stack 74. Secondary stack 74 is illustrated in cross-section in FIG. 4. The extent of the individual secondary unit cells 72 in the secondary stack 74 is indicated by dashed lines. The stacking of the secondary unit cells 72 forms a repeating arrangement of rods. Each secondary unit cell 72 is formed from a 5×5 array of rods, so the secondary stack 74 comprises a repeating arrangement of rods that repeats every 5 columns and every 5 rows.

The secondary unit cells 72 are taped and fused at both ends. In other embodiments, the secondary unit cells 72 may be held together in any suitable manner.

Figure 4:
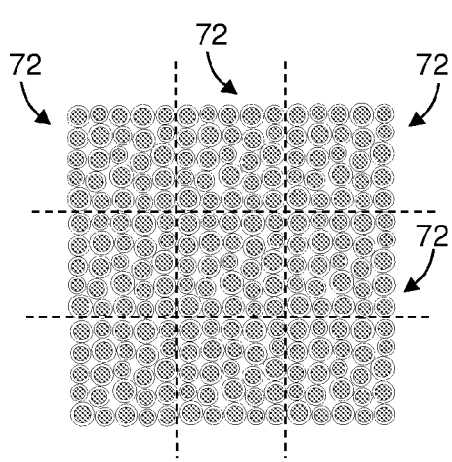
FIG. 4 is a schematic illustration of the stack of FIG. 3 when drawn down and stacked again.

FIG. 4 shows one secondary stack 74, which is formed from 5 secondary unit cells 72. In practice, further secondary unit cells 72 are also stacked together to form further secondary stacks 74. A total of 9 secondary stacks 74 are formed.

The uniform size and shape of the secondary unit cells 72 (which in this embodiment are square) may allow the secondary unit cells 72 to be easily stacked. The secondary stack 74 may be a stack of identical or near-identical components (secondary unit cells 72). The secondary unit cells 72 may be considered to be tiled such that they fill space.

In other embodiments, the secondary unit cells may have any regular geometric shape that may be stacked together, for example a rectangle, a parallelogram, a rhombus, or a hexagon.

In further embodiments, each secondary unit cell has an interlocking shape (for example, a shape that may be considered to resemble a jigsaw piece). At stage 56, the secondary unit cells are arranged such that they interlock.

In some circumstances, there may be some deformation of the primary or secondary stacks when they are drawn. For example, there may be some twisting of the stacks. In some circumstances, some types of distortion may prevent such an interlocking unit cell from successfully interlocking with other unit cells. It may be the case that the use of a regular shape that is not interlocking (for example, a square or hexagon) may result in greater tolerance to distortions.

In the present embodiment the secondary unit cells 72 are stacked in a 3×3 square array. In other embodiments, any number of secondary unit cells 72 may be stacked together. Any suitable stack of secondary unit cells 72 may be used. The stack of secondary unit cells 72 may have any regular geometric shape.

At stages 58 to 62, the new uniform square stack (secondary stack 74) is drawn down and stacked again, placed in a jacket tube 80 and packing glass 82 added to hold the structure. Each of stages 58 to 62 is now described in detail.

At stage 58, each secondary stack 74 is drawn down using fibre drawing apparatus 10, or a further drawing apparatus. During the drawing process, the secondary unit cells are heated and rods of each secondary unit cell 72 become fused to neighbouring rods from other secondary unit cells 72 at the points at which they touch. Interstitial air gaps remain between rods of different secondary unit cells 72, and between rods within each secondary unit cell 72.

The secondary stack 74, once drawn down, may be considered to form a tertiary unit cell 76. Tertiary unit cell 76 has a uniform shape, which may make it easy to stack together. In the present embodiment, the tertiary unit cell 76 has a side length of 4.5 mm.

Figure 5:
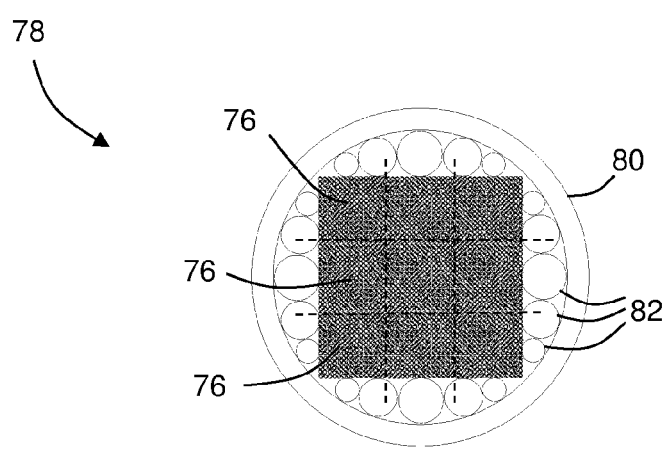
FIG. 5 is a schematic illustration of the stack of FIG. 4 when drawn down and stacked again and placed into a jacket tube.

At stage 60, 9 tertiary unit cells 76 are stacked together in a 3×3 arrangement as shown in FIG. 5. In FIG. 5, dashed lines indicate the extent of each tertiary unit cell 76. In other embodiments, any suitable shape of stack may be used. Any number of tertiary unit cells 76 may be stacked together.

At stage 62, the stack of 9 tertiary unit cells 76 is placed in a jacket tube 80. Packing glass 82 is added between the jacket tube and the tertiary unit cells 82 to hold the tertiary unit cells 76 in their 3×3 arrangement within the jacket tube 80. The packing glass 82 comprises a plurality of solid glass rods that are not configured to transmit light. The solid glass rods are placed around the square stack of tertiary unit cells 76 to fill space between the square stack and the round jacket tube 80. The tertiary unit cells 76, jacket tube 80 and packing glass 82 may be considered to form a final assembly 78.

At stage 64, the final assembly 78 is drawn down using fibre drawing apparatus 10, or a further drawing apparatus. A vacuum attachment is used to suck out air from gaps between the cores, removing the gaps between the rods.

The drawing down process of stage 64 results in an optical fibre apparatus, which in this embodiment is a coherent imaging fibre. The coherent imaging fibre may be configured to transmit visible, infrared and/or ultraviolet light. The coherent imaging fibre may be considered to form an array of light guiding elements (the light guiding elements in this case are the cores of the rods that have been drawn to form the coherent imaging fibre), arranged in a repeating arrangement of light guiding elements. As described above, the repeating arrangement of light guiding elements having different sizes may reduce cross-talk between the light guiding elements. For example, no light-guiding element may have a nearest- or next-to-nearest light guiding element of the same size.

Figure 6A:
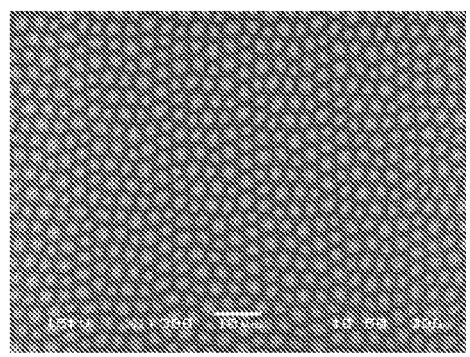
FIGS. 6a, 6b and 6c are scanning electron microscope (SEM) images of the cores of a coherent imaging fibre according to an embodiment.
Figure 6B:
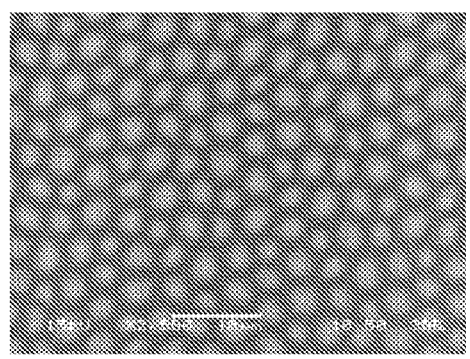
Figure 6C:
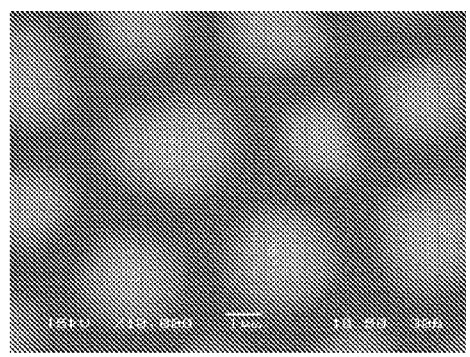

FIGS. 6a, 6b and 6c each show scanning electron microscope images of cores of a coherent imaging fibre according to an embodiment. FIG. 6a shows the cores at a magnification of ×1,300. FIG. 6b shows the cores at a magnification of ×2,500. FIG. 6c shows the cores at a magnification of ×10,000.

In the present embodiment, the cores are drawn such that all the cores in the coherent imaging fibre are multimode. The cores are drawn such that the smallest core 36A does not become single mode. In other embodiments, the cores may be drawn such that all of the cores in the imaging fibre are single mode.

In the present embodiment, a spacing between the cores in the coherent imaging fibre is around 3.5 μm. For comparison, a spacing between cores in a multicore telecommunications fibre may be around 10 μm. The spacing between cores may be a spacing in a plane that is substantially parallel to a direction of light transmission.

In further embodiments, a diameter of each of the cores in the coherent imaging fibre may be, for example, between 1.5 μm and 10 μm. The diameter of the cores may be measured in a plane that is substantially perpendicular to a direction of light transmission. In some embodiments, the cores in the coherent imaging fibre may not be circular. If the cores are not circular, any diameter of the cores may be measured, for example a largest diameter or smallest diameter.

When considering core sizes, it may be taken into account that smaller cores may be placed closer together than larger cores. Placing cores closer together may improve imaging resolution.

In the present embodiment, the coherent imaging fibre is configured to transmit light in a range of wavelengths from 400 nm to 850 nm. In other embodiments, the coherent imaging fibre may be configured to transmit light at any suitable wavelengths, for example at wavelengths between 350 nm and 2000 nm.

In the present embodiment, an outer diameter of the fibre is 550 μm. However in other embodiments the outer diameter of the fibre may be increased or decreased by adding or subtracting cores. Adding or subtracting cores may change the field of view of the fibre.

In some circumstances, fibres may start to become not flexible at a diameter of over 1 mm. However, image guiding or manipulating rigid rods may be formed. In some circumstances, fibres of less than 80 μm in diameter may contain too few cores to provide good imaging performance.

In the present embodiment, the coherent imaging fibre is between 1 metre and 5 metres long. In other embodiments, any suitable length of imaging fibre may be used. In many embodiments, for example in medical imaging embodiments, a length of a few metres may be appropriate. This length may be compared with that of fibres used for telecommunications applications, which may be kilometres long. In some circumstances, the cores in an imaging fibre according to an embodiment may be closer together than cores in a conventional telecommunications fibre.

In the present embodiment, the coherent imaging fibre resulting from the process of FIG. 2 is packaged with a plurality of sensing fibres and a capillary tube to form a multi-functional fibre apparatus. The coherent imaging fibre, sensing fibres and capillary tube are placed within a further glass or polymer tube, which may be referred to as a package. The further glass or polymer tube may be shorter than the coherent imaging fibre, sensing fibres and capillary tube. The package contains the coherent imaging fibre, sensing fibres and capillary tube, which are fixed in place using epoxy.

One end of the resulting fibre apparatus, which may be referred to as the distal end, is filled with epoxy and then polished.

At the other end of the fibre apparatus, which may be referred to as the distal end, the coherent imaging fibre, sensing fibres and capillary tube extend beyond the further glass or polymer tube. An optical coupler, for example an FC connector, is attached to the distal end of the coherent imaging fibre and is used to couple the coherent imaging fibre to an optical instrument, for example to a device comprising an optical source and optical detector.

A distal end of the each of the sensing fibres may be coupled to a sensing apparatus, for example an optical instrument and/or spectrometer.

A connector is attached to a distal end of the capillary tube. The connector allows a syringe to be coupled to the capillary tube in order to introduce substances into the capillary tube, for example to introduce fluorescent probes.

In other embodiments, the optical fibre apparatus may be packaged with any suitable further fibre and/or capillary tube. In some embodiments, the optical fibre apparatus, further fibre and/or capillary tube are fabricated separately and then packaged together. In other embodiments, the further fibre and/or capillary tube are fabricated in the same fabrication process as the optical fibre apparatus. For example, the further fibre and/or capillary tube may be drawn down in the same drawing process as rods of the optical fibre apparatus.

In use, a distal end of the multi-functional fibre assembly is positioned inside the body of a human or animal subject, for example inside the lung of a patient. Any suitable method of deploying the multi-functional fibre assembly may be used. For example, the multi-functional fibre assembly may be inserted through the working channel of the bronchoscope and deployed from the working channel into the distal lung.

The capillary tube is used to introduce substances into the distal lung, for example to introduce fluorescent probes to facilitate imaging. The imaging fibre is used to image the distal lung. The sensing fibres are used to sense signals from the distal lung. The imaging fibre and/or sensing fibres may deliver light from the distal lung to a spectrometer configured to perform spectroscopy of the delivered light.

The imaging fibre may be used to project an image using lenses. The imaging fibre may be used to project an image onto a corresponding sensor.

It may be considered that the method of FIG. 2 provides a fabrication technique creating a uniform sized secondary unit cell 72 from non-uniform sized primary unit cells (the differently-sized rods 36A, 36B, 36C, 36D, 36E) in a multi-stacking process. The technique comprises packing n non-uniform elements in an n×n square array such that each row and column contains the same variation of rod sizes resulting in a square unit cell for the next multi-stacking phase.

In the present embodiment, n=5. The preform is drawn to form 5 different sizes of rod. The 5 different sizes of rod are packed in a 5×5 square array such that each row or column contains one of each size of rod.

The method of FIG. 2 allows for a single preform to be used to produce all the cores of the multiple core optical fibre apparatus. The method of FIG. 2 may allow for the size of the cores to be easily varied. By adding extra variations in core size, cores of the same size may be kept significant distances apart. The use of a single preform may lead to lower costs and/or a simpler process than methods in which different preforms with different core to cladding diameter ratios are used.

In the method of FIG. 2, one conventional telecommunications preform is used to form the optical fibre apparatus without the need for jacket tubes. In some methods, after drawing rods from the preform, the rods may be placed into different jacket tubes. The jacket tubes may then be drawn again by making a stack, which may add significant time to the fabrication process. Since the method of FIG. 2 does not use such a jacketing step, the method FIG. 2 may be faster than methods that do use such a jacketing step.

By using the method of FIG. 2, a significant reduction in fabrication time and/or material costs and/or production costs may be obtained. Telecommunications preforms may be cheap and widely available. The use of telecommunications preforms (whether or not a single type of preform is used) may reduce costs. Telecommunications preforms may have a lower numerical aperture than some preforms that are used for imaging. The use of different core sizes to reduce cross coupling may allow lower-numerical aperture materials to be used than would be possible if all the core sizes were the same.

Using the multi-stacking method described above with reference to FIG. 2, primary stacks can be drawn down to smaller rods and this secondary unit cell restacked to easily increase the number of cores in a fibre (instead of stacking large number of rods initially, for example stacking tens of thousands of rods).

It may be the case that coupling in multicore fibres is worse if the cores are identical; if there is low contrast between the core and cladding of an individual rod; and/or if the wavelength used is relatively long. In the embodiment of FIG. 2, separation of identical cores is used to reduce coupling between cores of a multicore fibre. The separation of identical cores that are formed from the same preform may provide a cheap and effective method of reducing coupling between cores.

In some circumstances, the use of different sizes of cores may mean that it is not necessary to use other methods, for example interstitial elements, in order to reduce cross-talk between cores.

The differences in core size between the different rods 36A, 36B, 36C, 36D, 36E may not have a significant impact on imaging performance. In some embodiments, an imaging performance of an imaging fibre made using the method of FIG. 2 may be similar to an imaging performance achieved using heavily-doped Ge-doped glass having random core size variation. However, the imaging fibre made using the method of FIG. 2 may be cheaper than imaging fibre formed of heavily-doped Ge-doped glass having random core size variation.

The use of mass produced materials shared by the telecommunications industry may reduce imaging fibre cost. In an imaging fibre, it may be desired to place individual cores of the fibre as close together as possible, but core to core spacing may be limited by the cross coupling of light between the cores. By reducing cross-coupling, the method of FIG. 2 may allow cores to be placed close together, which may result in a fibre capable of transmitting a high resolution image.

The method of FIG. 2 may be used to develop a low-cost imaging fibre which may be packaged into a robust device such that it may be disposable after a single use. Producing a low-cost disposable imaging fibre may eliminate the need for sterilization procedures between uses, and therefore may eliminate any degradation of the imaging fibre that may occur during sterilization. Contamination crossover between patients may be prevented. Clinical workflow may be significantly improved.

In some embodiments, the imaging fibre made using the method of FIG. 2 is a flexible imaging fibre. In some embodiments, the imaging fibre is a rigid fibre, for example a rigid imaging rod.

The imaging fibre, for example the rigid imaging rod, may be used to project an image onto a sensor array. The regular array of cores in the imaging fibre may be used in projecting the image onto a sensor array. The sensor array may be a regular array of sensors, for example a square array. In some circumstances, the regular array of the imaging fibre may be preferable for projecting onto a sensor array when compared to an imaging fibre in which different sizes of cores are randomly arranged.

In some circumstances, the fabrication method of FIG. 2 may ensure an almost arbitrary separation of cores of the same size with the initial use of one preform. Any suitable number of different core sizes may be used.

In one embodiment, a fibre preform is drawn to form rods having 4 different core sizes. The rods are stacked in a 4×4 square array in which each row or column contains one of each size of rod. By using at least 4 different sizes of rod, it may be possible to obtain an arrangement of rods in which each rod has no nearest neighbour that has the same size.

In the embodiment described above with reference to FIGS. 2 to 5, the preform 30 is drawn to form rods of 5 different sizes. The rods are stacked in a 5×5 square array in which each row or column contains one of each size of rod. By using at least 5 different sizes of rod, it may be possible to obtain an arrangement of rods in which each rod has no nearest neighbour or next-to-nearest neighbour that has the same size.

In some embodiments, the preform is drawn to form rods of 9 different sizes. The rods are arranged as a square array of rods in which each row or column contains one of each size of rod. By using at least 9 different sizes of rods, it may be possible to obtain an arrangement of rods in which each rod has no nearest neighbour, next-to-nearest neighbour, or next-to-next-to-nearest neighbour that has the same size.

In further embodiments, any number of different sizes of rods may be used. In some circumstances, the use of a greater number of sizes of rod may result in more distortion of the stack when it is drawn. There may be a trade-off between spacing of identical cores against distortion effect, since more sizes of core may result in a greater spacing of identical cores but also in increased distortion.

The rods may be arranged in any suitable manner, for example in a square array or hexagonal array. The rods may be arranged to form any one or more selected shapes. For example, rods may be arranged to form a stack having the shape of a square, rectangle, rhombus, parallelogram or hexagon.

Any number of rods may be stacked to form a primary stack (which is drawn to form a secondary unit cell). Any number of secondary unit cells may be stacked to form a secondary stack (which may be drawn to form a tertiary unit cell). Any number of tertiary unit cells may be stacked to form a tertiary stack (which may be drawn to form an imaging fibre).

Any unit cell may be formed by stacking different sized rods to form any selected shape, then stacking those regular shapes in a periodic lattice of those selected shapes. In some embodiments, two or more different selected shapes may be stacked. For example, a square stack may be formed that comprises one unit cell (for example, one secondary unit cell) and a rectangular stack may be formed that comprises two unit cells. The rectangular stack may have the size, and the rod arrangement, of two of the square stacks. The square and rectangle may be stacked together to form a further stack.

In one embodiment, an imaging fibre having 8000 cores is formed by stacking 5×5 rods to form a primary stack; stacking 6×6 secondary unit cells to form a secondary stack; and stacking 3×3 tertiary unit cells to form a tertiary stack, which is drawn to form the imaging fibre.

In further embodiments, any number of multi-stacking iterations may be used. For example, the rods may be drawn down twice, three times, four times, or five times.

Any suitable materials may be used to form the optical fibre apparatus. For example, any suitable preform may be used. The optical fibre apparatus may comprise, for example, silica, Ge-doped silica, Fluorine doped silica, boron doped silica, Aluminium doped silica, or silicate glass. In some circumstances, silicate glasses may be used to get very high index contrasts, for example Schott glasses SF6 and LLF1.

Although embodiments comprising imaging fibres are described above, in other embodiments any suitable multiple core optical fibre apparatus may be formed. The multiple core optical fibre apparatus may be used for any suitable purpose.

In the embodiments described above, the rods have different outer sizes. In other embodiments, an optical fibre apparatus may be formed using rods that have substantially the same outer size, but different core sizes. The use of different core sizes may reduce cross-coupling even when the rods are of the same size.

In some embodiments, different preforms are obtained (for example, different commercial preforms) and are drawn into similarly-sized rods. The different preforms have different core to cladding ratios. Therefore, once drawn to the same outer size, the rods have different core sizes. The rods are stacked into a regular array, for example a square or hexagonal array. The arrangement of the rods is such that each rod does not have any nearest-neighbour rods that have the same core size.

In other embodiments, a single type of preform is obtained. The preform is then jacketed with further cladding of one or more different sizes, to create preforms having different core to cladding ratios. The different preforms are then drawn into rods of the same size, stacked and drawn.

We now describe a method to fabricate using high quality imaging fibres using a single multimode telecommunications preform available from Draka-Prysmian. (0M1 PCVD rod). Our techniques involve multi-stacking arrays of different sized cores such that no two adjacent cores are the same size.

In our first fibre we jacket three different sizes of rods drawn from our preform and stack them in a hexagonal array. In our second fibre demonstrate a technique to achieve low cross coupling over a broad wavelength range by drawing the preform down to rods of various sizes and stacking these rods in a square array. The distribution of the rods in the square array is such that when it is drawn down it forms a uniform square stack which can then be easily restacked multiple times in order to form an imaging fibre of many thousands of cores. This may eliminate the need to jacket and re-draw rods to form different sized cores making this technique economical and rapid in comparison to our hexagonal fabrication method.

The first fibre is a hexagonal array imaging fibre. The core material for our first fibre was derived from a commercial preform manufactured for telecoms applications. It had a graded index germanium doped core surrounded by a thin pure silica jacket. The core-cladding diameter ratio of the preform was 0.74 with a peak refractive index contrast corresponding to an NA of 0.3.

Figure 7:
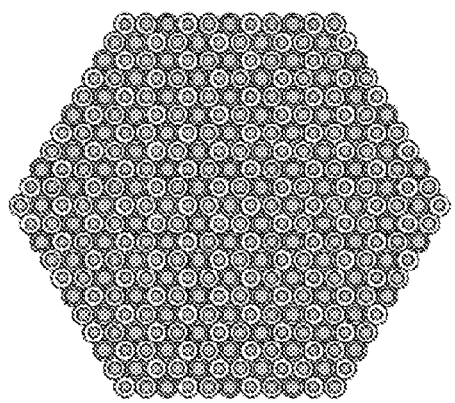
FIG. 7 is a schematic illustration of a hexagonal stack of 331 rods.

The preform was drawn down to rods of three different sizes. Two sizes of the rods were jacketed in pure silica tubes with two different inner to outer diameter ratios, and the rest remained unjacketed. The jacketed rods were then drawn down again to form rods all of which had an outer diameter of 1 mm but with three different core diameters. The uniform rods could now be stacked in a hexagonal array of 331 where no two neighbouring rods had the same core diameter. FIG. 7 shows the layout of our initial stack of 331 rods. Germanium doped regions are illustrated in grey and pure silica regions are white.

Figure 8:
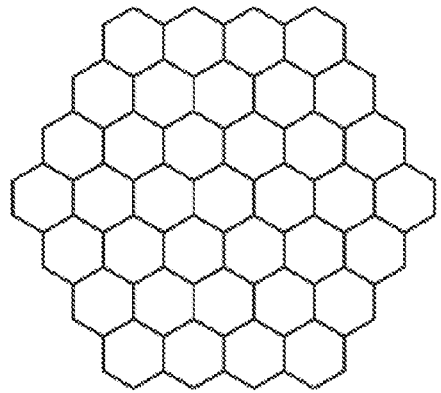
FIG. 8 is a schematic illustration of a second stage of hexagonal stacking, where each hexagon represents a respective initial stack of 331 rods as shown in FIG. 7.

The top end of the stack was wrapped in PTFE tape to hold it in place and allow it to be gripped in the chuck of a fibre drawing tower. Smaller sections of PTFE tape were also wrapped around the stack at different points in order to hold it in place. The stack was drawn unjacketed down to canes with each section of PTFE tape removed before it reached the furnace. FIG. 8 shows the layout of our second stage stack, where each hexagon represents the initial stack of 331 cores.

Figure 9:
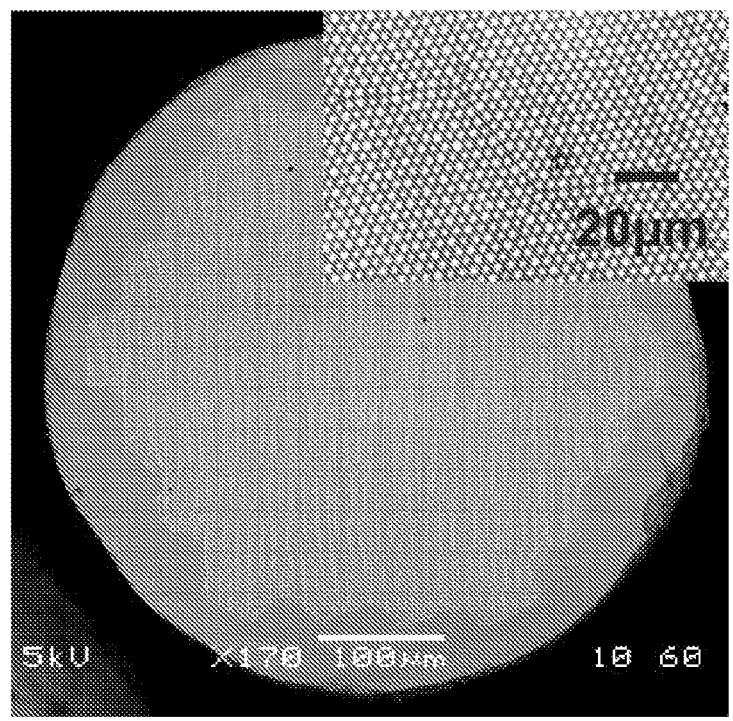
FIG. 9 is a SEM image of a hexagonal array imaging fibre.

To form a final fibre, 37 of the canes were stacked and jacketed in a pure silica tube. This stack was then drawn to fibre with an outer diameter of 525 μm using a vacuum to collapse the interstitial spaces. A scanning electron micrograph of the final fibre can be seen in FIG. 9 where the insert shows a higher magnification in order to see the core pattern. Doped regions appear lighter in the SEM. FIG. 9 shows a magnified section of the core pattern.

The final core diameters in the fibre were 2.78 μm, 2.45 μm and 2.12 μm with a centre to centre separation of 3.71 μm. There were 12,247 cores in total in the final fibre.

Our second imaging fibre was a square array imaging fibre. The second imaging fibre was formed from a graded index preform having the same parameters to that used to make the first fibre. A stable stack was made from rods drawn to different outer diameters, so that there was no need for a jacketing stage.

The fabrication method uses N different sized elements stacked in an N×N array to form a uniform square element. Once the uniform square element has been formed it is easily stacked multiple times to build up a large array of cores. The stacked squares can easily be drawn down again and restacked in order to easily build up very large arrays.

A three stage process was used. Firstly a 5×5 array of 5 different rod sizes (2.23 mm, 2.52 mm, 2.74 mm, 2.95 mm and 3.17 mm) was stacked in a square stacking jig such that each size only appears in each row or column once. The end view of this stack was as shown in FIG. 3. FIG. 3 is a representation of an initial stack in which grey indicates germanium doped core regions and white indicates the pure silica cladding regions.

The ends of the stack were fused together using a hydrogen torch and PTFE tape was wrapped around the length at several points in order to hold the stack in place. The stack was fed into the furnace and drawn down to 2.5 mm sided squares, the PTFE tape being unwound before it reached the furnace. This process generated a set of square unit elements with a similar cross section to that shown in FIG. 3.

Figure 10:
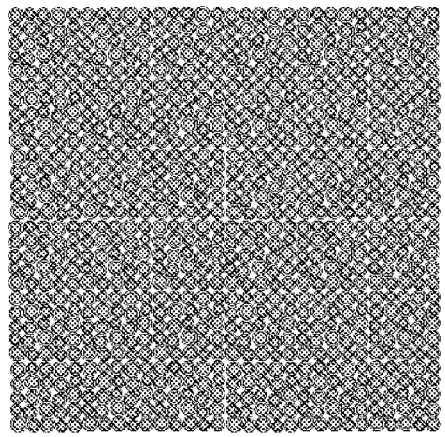
FIG. 10 is a schematic illustration of a 6×6 array of drawn square stacks, where the square stacks are as shown in FIG. 3.

The unit squares were restacked with the same orientation in a 6×6 array. The second stacking stage of the process is shown in FIG. 10. The ends were again fused and the central region held in place with PTFE tape. This stack was drawn to 4.5 mm sided squares and restacked in a 3×3 array.

The final stack was placed into a jacket tube with pure silica packing rods around the outside and drawn to canes under a vacuum to remove the interstitial gaps. Finally the canes were drawn to fibre.

Figure 11:
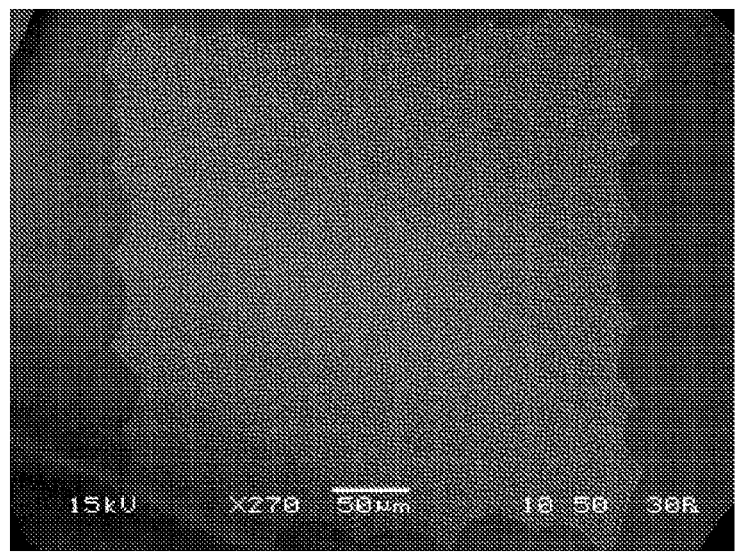
FIG. 11 is a SEM image of a fibre formed from the array of FIG. 10 when restacked and jacketed and drawn to fibre.

An SEM image of the final fibre can be seen in FIG. 11, in which doped cores appear lighter. The core diameters in the fibre were between 2 and 3 μm with 3 to 4 μm centre to centre separations depending on the particular pairs of core sizes. There were 8,100 cores in total in the final fibre. The outer diameter of the fibre was 550 μm with an imaging square size of 450 μm along the diagonal. A scalloped appearance of the edge of the imaging region is due to the presence of glass packing tubes.

To compare the performance of our hexagonal array imaging fibre of FIGS. 7 to 9 and the square array imaging fibre of FIGS. 3, 10 and 11 we performed two tests. The first was to acquire fluorescence images of 1951 USAF test targets, and the second was to transmit a fringe pattern and measure the degradation of the fringe visibility with wavelength.

An endoscopic fluorescence imaging system was built in order to obtain test target images which could be used to determine the resolution of the square array fibre and of the comparison fibre at different wavelengths.

A supercontinuum source filtered to two excitation bands (420 nm to 510 nm and 600 nm to 650 nm) was used as a light source for our experiment. The filtered excitation light passed through a dichroic beam splitter and was coupled to the square array fibre (or to the comparison fibre) through an aspheric lens with an NA of 0.5.

The USAF 1951 targets were imaged at zero working distance from the distal end of the square array fibre (or the comparison fibre) with either a green fluorescent or red fluorescent slide placed behind them. Light emerging back out of the proximal end of the square array fibre (or the comparison fibre) was imaged onto a CCD camera after passing through the dichroic beam splitter and a second collection filter with two wavelength bands, 520 nm to 600 nm (green band) and 650 nm to 750 nm (red band). These wavelength ranges for collection were chosen to be in in the range of several reported chemical imaging probes which have the potential to be used to indicate the presence of bacterial or fungal pathogens. Using a two colour (wavelength band) system may allow for the detection of multiple biological targets through the same imaging system.

Figure 12:
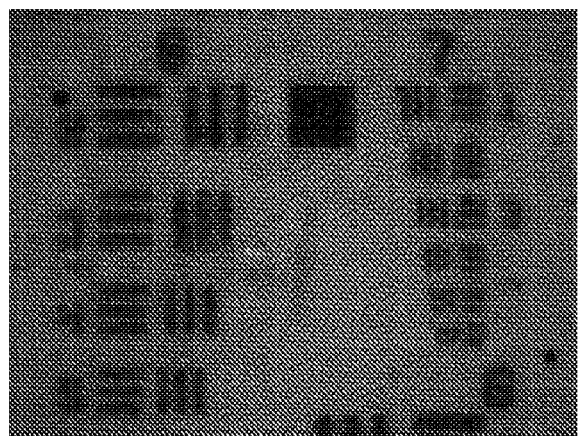
FIG. 12 is a USAF 1951 test target fluorescent image taken through a hexagonal array fibre at 520 nm to 600 nm.
Figure 13:
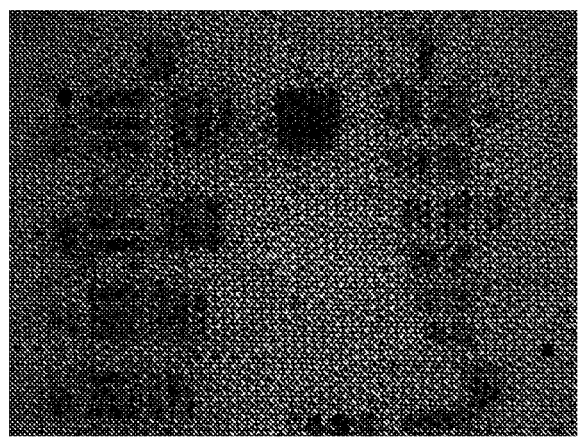
FIG. 13 is a USAF 1951 test target fluorescent image taken through a hexagonal array fibre at 650 nm to 750 nm.
Figure 14:
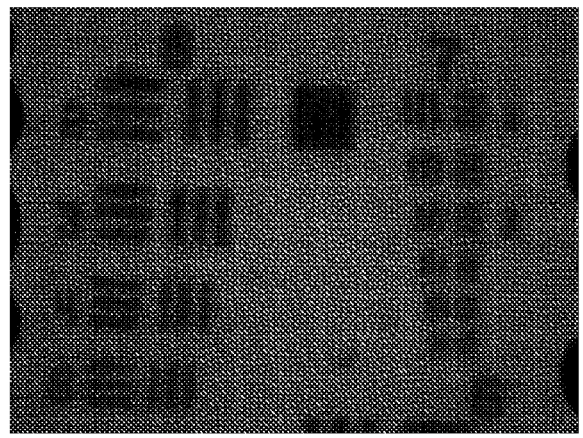
FIG. 14 is a USAF 1951 test target fluorescent image taken through a square array fibre at 520 nm to 600 nm.
Figure 15:
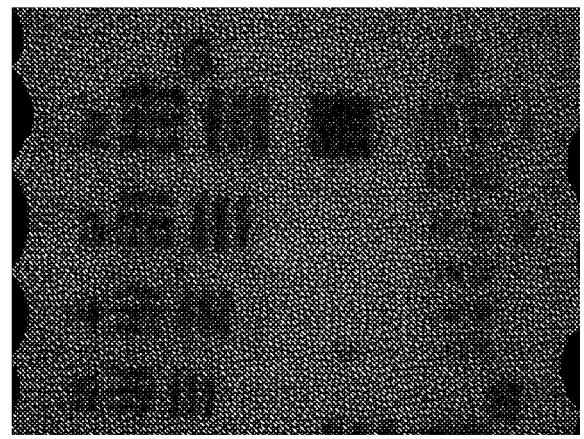
FIG. 15 is a USAF 1951 test target fluorescent image taken through a square array fibre at 650 nm to 750 nm.

Images of the USAF 1951 test targets taken at two wavelength bands can be seen in FIGS. 12 to 15. FIG. 12 shows the hexagonal array fibre at 520 nm to 600 nm. FIG. 13 shows the hexagonal array fibre at 650 nm to 750 nm. FIG. 14 shows the square array fibre at 520 nm to 600 nm. FIG. 15 shows the square array fibre at 650 nm to 750 nm.

In the green band images for both fibres (FIG. 12 and FIG. 14), several of the larger elements of group 7 are discernible down to element 4 in the hexagonal array fibre and element 2 in the square array fibre. (The elements have line widths of 2.76 µm and 3.10 µm respectively.) These are comparable sizes to the core to core separations, indicating that very little light is coupling from an illuminated core into its neighbour in both fibres. In the red band (FIG. 13 and FIG. 15) the image contrasts are both degraded due to core to core coupling, principally between higher order modes which are visible in the dark regions. However in our square array imaging fibre the larger elements of group 7 are still discernible down to element 2 albeit with reduced visibility compared to the images taken in the green band.

A second characterization method is a quantitative method developed to measure the global effects of core to core coupling and accurately characterize the performance of imaging fibres, using a method described in H. A. Wood, J. M. Stone, K. Harrington, T. Birks, and J. C. Knight, "*Quantitative characterisation of endoscopic imaging fibres*" in Conference on Lasers and Electro-Optics, OSA Technical Digest (2016) (Optical Society of America, 2016), paper SM4P.6. The technique may be considered to be similar to the measurement of the modulation transfer function in imaging systems relying on quantifying the degradation in visibility of a transmitted fringe pattern as it passes through an imaging fibre.

Figure 16:
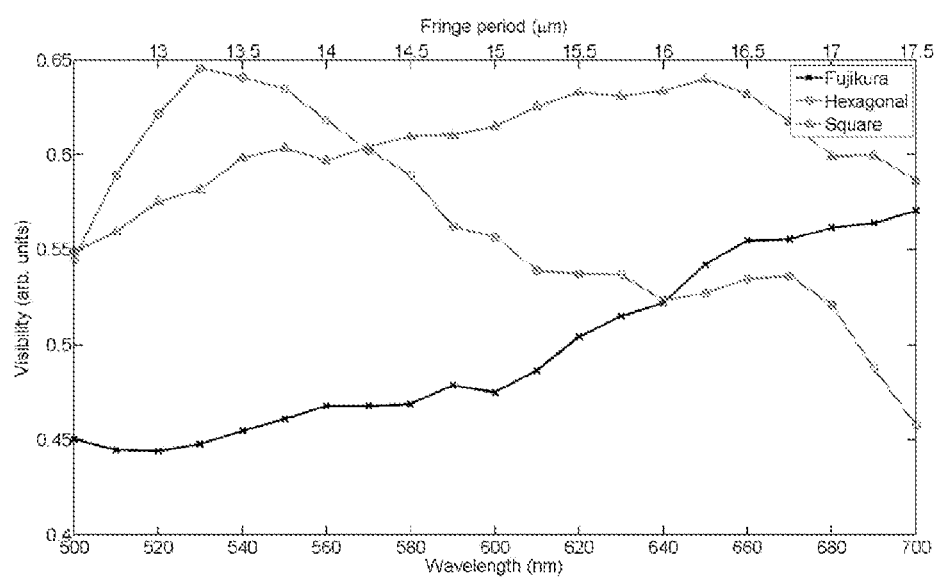
FIG. 16 is a plot of fringe visibility measurements varying with wavelength for a square array fibre, a hexagonal array fibre, and a commercial imaging fibre made by Fujikura, Ltd.

FIG. 16 shows fringe visibility measurements varying with wavelength for our hexagonal array fibre (represented by triangles) and square array fibre (represented by circles) and a commercial imaging fibre, which is a section of FGIH-30-650s fibre from Fujikura Ltd (represented by crosses). Transmission is shown for wavelengths between 500 nm and 700 nm. The visibility is measured after transmission through approximately 90 cm of fibre in each case. Error bars represent the standard deviation of a series of data points taken at a single wavelength, adjusting and then realigning the system between each measurement.

Two arms of an interferometer were interfered at a known angle to produce a vertical fringe pattern of known separation. The fringe pattern was transmitted down the test fibre and the visibility measured at the output on a CCD camera. Using a supercontinuum and a monochromator as an illumination source for our interferometer we were able to measure the transmitted fringe visibility with wavelength. Our interferometer was set up with an angle of 2.29° to give 15 µm fringes at 600 nm wavelength. The fringe separation varies with wavelength due to diffraction and the corresponding variation can be seen on the top axis of FIG. 16. The fringe pattern was formed on the end of ~90 cm sections of our fibres and the emerging pattern was imaged onto a CCD camera mounted on a goniometer in order to align the fringe pattern and CCD array. The output coupling was via a 0.5 NA aspheric lens.

In an ideal fibre, a fringe pattern would not lose any visibility as it passes down the length. However, core-to-core coupling reduces the contrast in the image and hence the measured visibility.

The FGIH-30-650s fibre is common in commercial systems specified over our wavelength band. The centre to centre core separation of this fibre was measured to be around 3.5 µm, with core diameters of between 1.7 µm and 2.1 µm and NA reported to be 0.4. The cores in the fibre appeared to have a random arrangement.

The fringe visibility of our hexagonal array fibre at short wavelengths is highest up to a wavelength of 550 nm but its performance begins to degrade as the wavelength increases. As there are only three core sizes in this fibre we attribute this degradation in fringe visibility to light coupling to the identical next nearest neighbour cores.

This is reinforced in the test target images where it can be seen in FIG. 13 that one particular size of core is coupling strongly into dark regions in a higher order mode. In our square array fibre, the fringe visibility at short wavelengths is lower than the hexagonal array but generally more consistent and higher over the whole wavelength range, only starting to perform below the FGIH-30-650s commercial fibre above 680 nm.

We have presented two methods of fabricating endoscopic imaging fibres using graded index preforms designed for telecommunications. Our fibre based on a square array with several different core sizes positioned such that identical cores are not in close proximity gives significantly improved imaging performance over a broad wavelength range compared to a widely used commercial fibre with higher numerical aperture cores. Fluorescence images of USAF test target with a 3.1 µm line width are discernible in our square array fibre in the wavelength band 520 nm to 600 nm and 3.48 µm in the wavelength range 650 nm to 750 nm. This fibber's fabrication technique was based on a simplified stacking procedure using rods derived from telecoms preforms of lower index contrast than commercial imaging fibres (NA of 0.3 compared to 0.4). This procedure therefore allows imaging fibres to be produced from relatively low cost starting materials, and potentially paves the way for cost-effective disposable imaging fibres for use in clinical procedures.

It may be understood that the present invention has been described above purely by way of example, and that modifications of detail can be made within the scope of the invention.

Each feature disclosed in the description and (where appropriate) the claims and drawings may be provided independently or in any appropriate combination.

The invention claimed is:
1. A method of forming an imaging fiber apparatus comprising:

arranging rods to form a plurality of stacks each comprising a respective plurality of rods, wherein:
for each stack, the respective plurality of rods comprises rods having different core sizes, the rods of different core sizes being arranged in a selected arrangement, and the rods of different core sizes being arranged such that each stack has a respective selected shape;
wherein the selected shape or shapes are such that the stacks stack together in a desired arrangement;
the method further comprising:
drawing each of the plurality of stacks;
stacking together the plurality of drawn stacks together in the desired arrangement to form a further stack;
drawing the further stack; and
using the drawn further stack to form an imaging fiber apparatus,
wherein the selected arrangement of the rods in each stack and the selected shape or shapes of the stacks are such that the further stack comprises a repeating pattern of rods of different core sizes and for each of said rods of said further stack the nearest-neighbor rods for said rod have different core sizes to said rod, wherein each stack comprises a plurality of rows and a plurality of columns, and wherein, for each stack, each row of the stack comprises at least one rod of each of a plurality of different core sizes, and each column of the stack comprises at least one rod of each of the plurality of different core sizes.

2. The method according to claim 1, wherein for each stack, the respective plurality of rods comprises rods having different outer sizes.

3. The method according to claim 1, wherein for each stack, each of the respective plurality of rods has substantially the same ratio of core size to outer size.

4. The method according to claim 1, the method further comprising obtaining the rods by drawing at least one preform.

5. The method according to claim 4, wherein the obtaining of the rods comprises drawing a selected type of preform, wherein different core sizes are obtained by drawing the same selected type of preform differently.

6. The method according to claim 1, wherein the using of the drawn further stack to form an imaging fibre apparatus comprises jacketing the drawn further stack.

7. The method according to claim 1, wherein the selected arrangement is such that, for each rod, the next-to-nearest neighbour rods for said rod have different core sizes to said rod.

8. The method according to claim 1, wherein the or each selected shape comprises a regular shape.

9. The method according to claim 8, wherein the or each regular shape comprises at least one of a square, a rectangle, a rhombus, a parallelogram, a hexagon, a regular polygon.

10. The method according to claim 1, wherein each of the stacks has substantially the same shape.

11. The method according to claim 1, wherein each of the stacks has substantially the same selected arrangement of rods.

12. The method according to claim 1, wherein:
the plurality of different core sizes comprises N different core sizes;
each stack comprises an N by N array of rods; and,
for each stack, each row of the stack comprises one rod of each of the N different core sizes; and each column of the stack comprises one rod of each of the N different core sizes.

13. The method according to claim 1, wherein:
the plurality of different core sizes comprises N different core sizes;
each stack comprises an array of yN columns by zN rows; and
for each stack, each row of the stack comprises y rods of each of the N different core sizes; and each column of the stack comprises z rods of each of the N different core sizes.

14. The method according to claim 1, wherein the forming of the optical fiber apparatus comprises performing at least one further stacking and drawing of the drawn further stack.

15. The method according to claim 1, wherein for each stack, arranging the respective plurality of rods to form the stack comprises positioning spacer elements between at least some of the respective plurality of rods.

16. The method according to claim 1, wherein each rod comprises at least one of silica, Ge-doped silica, Fluorine doped silica, boron doped silica, Aluminum doped silica, silicate glass.

17. The method according to claim 1, wherein the rods have outer sizes between 0.5 mm and 10 mm, optionally between 1 mm and 5 mm.

18. The method according to claim 1, wherein a width of each stack is between 10 mm and 100 mm.

19. The method according to claim 1, wherein a numerical aperture of each rod is less than 0.35, optionally less than 0.32, further optionally less than 0.3.

* * * * *